(12) United States Patent
Fukayama et al.

(10) Patent No.: US 12,184,820 B2
(45) Date of Patent: Dec. 31, 2024

(54) IMAGE READING APPARATUS AND RECORDING APPARATUS WITH CONTROL SUBSTRATES WITHIN A DOCUMENT FEED UNIT

(71) Applicant: SEIKO EPSON CORPORATION, Tokyo (JP)

(72) Inventors: Tatsuya Fukayama, Matsumoto (JP); Toshimitsu Ohara, Matsumoto (JP); Tadashige Yamagishi, Suzaka (JP); Masakazu Ishihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/059,872

(22) Filed: Nov. 29, 2022

(65) Prior Publication Data

US 2023/0171357 A1 Jun. 1, 2023

(30) Foreign Application Priority Data

Nov. 30, 2021 (JP) ................................. 2021-194030

(51) Int. Cl.
*H04N 1/00* (2006.01)
*H04N 1/12* (2006.01)
*H04N 1/23* (2006.01)

(52) U.S. Cl.
CPC ..... *H04N 1/00525* (2013.01); *H04N 1/00538* (2013.01); *H04N 1/00557* (2013.01); *H04N 1/00559* (2013.01); *H04N 1/0083* (2013.01); *H04N 1/121* (2013.01); *H04N 1/2307* (2013.01)

(58) Field of Classification Search
CPC .......... H04N 1/00525; H04N 1/00538; H04N 1/00557; H04N 1/00559; H04N 1/0083; H04N 1/00551; H04N 1/00519
See application file for complete search history.

(56) References Cited

U.S. PATENT DOCUMENTS

| | | | |
|---|---|---|---|
| 6,426,803 B1 | 7/2002 | Sasai et al. | |
| 6,559,977 B2 | 5/2003 | Sasai et al. | |
| 8,619,273 B2 * | 12/2013 | Mukai ................ | H04N 1/00557 358/401 |
| 10,574,844 B2 | 2/2020 | Yamamoto et al. | |
| 2002/0067513 A1 * | 6/2002 | Sasai .................. | H04N 1/00538 358/400 |
| 2007/0097459 A1 * | 5/2007 | Hashimoto ........ | H04N 1/00519 358/498 |

(Continued)

FOREIGN PATENT DOCUMENTS

| | | |
|---|---|---|
| CN | 1194911 A | 10/1998 |
| CN | 107920181 A | 4/2018 |

(Continued)

*Primary Examiner* — Benjamin O Dulaney
(74) *Attorney, Agent, or Firm* — WORKMAN NYDEGGER

(57) ABSTRACT

An image reading apparatus includes a scanner unit configured to read a document, a document feed unit provided above the scanner unit and configured to feed the document and read the fed document, a first substrate configured to control an operation of the scanner unit, and a second substrate configured to control an operation of the document feed unit, wherein the first substrate and the second substrate are provided in a substrate placement section of the document feed unit.

14 Claims, 17 Drawing Sheets

(56) References Cited

U.S. PATENT DOCUMENTS

| | | | |
|---|---|---|---|
| 2008/0252943 A1* | 10/2008 | Kozakura | H04N 1/00458 |
| | | | 358/474 |
| 2011/0235140 A1* | 9/2011 | Ito | H04N 1/2307 |
| | | | 358/498 |
| 2017/0070629 A1* | 3/2017 | Shiota | H04N 1/00904 |
| 2018/0103165 A1* | 4/2018 | Yamamoto | H04N 1/4426 |

FOREIGN PATENT DOCUMENTS

| | | |
|---|---|---|
| EP | 3310031 | 4/2018 |
| JP | 2002-199156 A | 7/2022 |

\* cited by examiner

IMAGE READING APPARATUS AND RECORDING APPARATUS WITH CONTROL SUBSTRATES WITHIN A DOCUMENT FEED UNIT

The present application is based on, and claims priority from JP Application Serial Number 2021-194030, filed Nov. 30, 2021, the disclosure of which is hereby incorporated by reference herein in its entirety.

BACKGROUND

1. Technical Field

The present disclosure relates to an image reading apparatus and a recording apparatus including a scanner unit and a document feed unit provided above the scanner unit and having a document reading section.

2. Related Art

JP-A-2002-199156 can be raised as an example of such an image reading apparatus.

JP-A-2002-199156 discloses an image reading apparatus comprising a first control substrate connected to a first optical reading device in an upper unit and a second control substrate connected to a second optical reading device in a lower unit.

The first optical reading device, which is an image sensor disposed in an ADF unit, which is the upper unit, reads one side of a document and sends it to the first control substrate, which is a control device in the ADF unit. After performing predetermined image processing, and it transmits it to the lower unit side.

On the other hand, the other side of the document is read by a second optical reading device, which is an image sensor disposed inside of the lower unit. And the second control substrate, which is the control device in the lower unit, processes image data of both front and back surfaces of the document received from the first control substrate and the second optical reading device and transmits it to an external image forming apparatus or the like.

In the image reading apparatus disclosed in JP-A-2002-199156, as described above, the first control substrate configured to receive the image data from the first optical reading device is disposed in the ADF unit constituting the upper unit. On the other hand, a second control substrate configured to receive the image data from the second optical reading device is disposed in the lower unit. That is, the first control substrate and the second control substrate are disposed in the upper unit and the lower unit, separately.

Therefore, it is necessary to secure space for disposing each control substrate in each of the upper unit and the lower unit, and there is a concern that this might lead to an increase in the size of the apparatus.

SUMMARY

In order to solve the above problems, an image reading apparatus according to the present disclosure includes a scanner unit configured to read a document, a document feed unit provided above the scanner unit and configured to feed the document and read the document, a first substrate configured to control an operation of the scanner unit, and a second substrate configured to control an operation of the document feed unit, wherein the first substrate and the second substrate are provided in a substrate placement section of the document feed unit.

Further, A recording apparatus according to the present disclosure includes above mentioned image reading apparatus and a recording unit configured to execute recording process based on data read by the image reading apparatus.

DESCRIPTION OF EMBODIMENT

Figure 1:
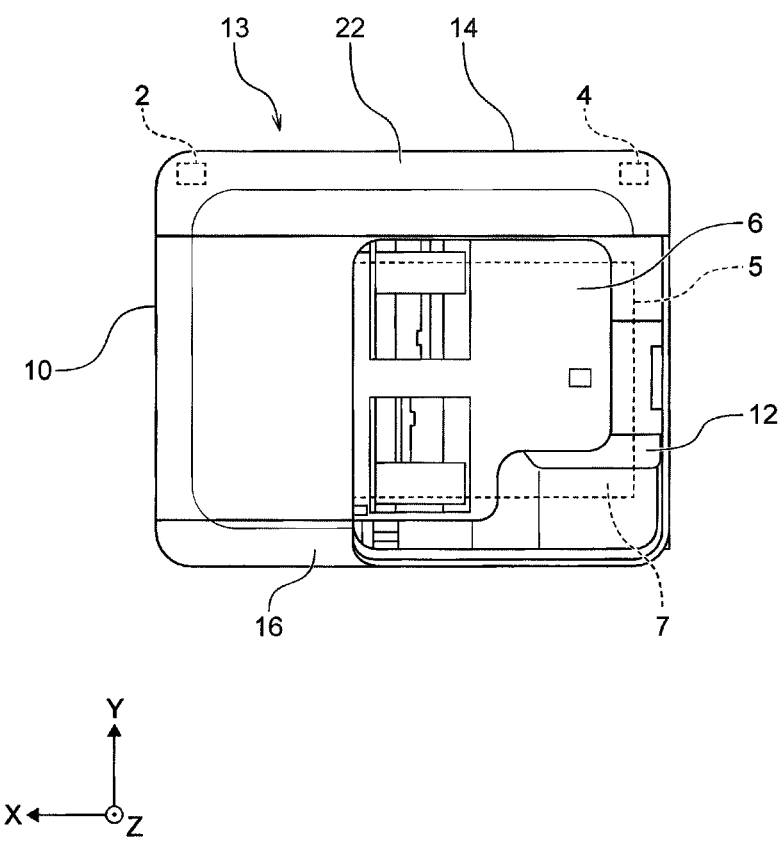
FIG. 1 is a plan view of an image reading apparatus according to an embodiment of a present disclosure.

Hereinafter, the present disclosure will be schematically described first.

In order to solve the above problems, in an image reading apparatus according to a first aspect of the present disclosure includes a scanner unit configured to read a document, a document feed unit provided above the scanner unit and configured to feed the document and read the document, a first substrate configured to control an operation of the scanner unit, and a second substrate configured to control an operation of the document feed unit, wherein the first substrate and the second substrate are provided in a substrate placement section of the document feed unit.

According to this aspect, the first substrate and the second substrate are provided in the substrate placement section of the document feed unit. As a result, since both the first substrate for the scanner unit and the second substrate for the document feed unit are provided in the document feed unit, it is not necessary to secure a placement space for placing a control substrate in both of the scanner unit and the document feed unit, and it is possible to suppress an increase in the size of the apparatus.

In addition, when it becomes necessary to replace either or both of the first substrate and the second substrate, a replacement work may be performed only on the document feed unit, and thus the work is facilitated.

In the image reading apparatus according to a second aspect of the present disclosure is the image reading apparatus according to the first aspect wherein the first substrate is disposed so as to extend in a first direction, which intersects a horizontal direction.

According to this aspect, by disposing the first substrate in a direction, which intersects the horizontal direction, for example, vertically, the size in the horizontal direction, that is, the size in the front-rear direction or the left-right direction can be suppressed.

In the image reading apparatus according to a third aspect of the present disclosure is the image reading apparatus according to the first or second aspect wherein the second substrate is disposed so as to extend in a first direction, which intersects a horizontal direction.

According to this aspect, by disposing the second substrate in a direction, which intersects the horizontal direction, for example, vertically, the size in the horizontal direction, that is, the size in the front-rear direction or the left-right direction can be suppressed.

In the image reading apparatus according to a fourth aspect of the present disclosure is the image reading apparatus according to the first aspect wherein the first substrate and the second substrate are disposed so as to extend in a first direction, which intersects a horizontal direction, and overlap each other as viewed in the horizontal direction.

According to this aspect, by disposing both the first substrate and the second substrate in a direction, which intersects the horizontal direction, for example, vertically, it is possible to more effectively suppress an increase in the size of the apparatus in the horizontal direction, for example, the front-rear direction.

In addition, since the first substrate and the second substrate overlap each other as viewed in the horizontal direction, it is possible to suppress the size of the apparatus in the horizontal direction, for example, the left-right direction. In the image reading apparatus according to a fifth aspect of the present disclosure is the image reading apparatus according to the fourth aspect, wherein the first substrate is disposed in the document feed unit to outside with respect to the second substrate.

According to this aspect, when only the first substrate is to be removed for maintenance or the like, it is not necessary to remove the second substrate or a wiring connected to the second substrate, so that the work is easier.

In the image reading apparatus according to a sixth aspect of the present disclosure is the image reading apparatus according to the fourth aspect or the fifth aspect further include a wiring connecting the first substrate and the second substrate, wherein a non-overlapping region where the first substrate and the second substrate do not overlap each other as viewed in the horizontal direction overlaps the wiring as viewed in the horizontal direction.

Here, "overlaps with the wiring as viewed in the horizontal direction" in "non-overlapping region where the first substrate and the second substrate do not overlap each other as viewed in the horizontal direction overlaps the wiring as viewed in the horizontal direction" means that the wiring connecting the first substrate and the second substrate is disposed through the non-overlapping region.

According to this aspect, by using the non-overlapping region where the first substrate and the second substrate do not overlap each other as viewed in the horizontal direction as a placement space for the wiring, it is possible to suppress an increase in the size of the apparatus due to the protrusion of the wiring. Further, bypassing the wiring through the non-overlapping region, the length of the wiring can be shortened.

Further, if the wiring is concentrated around the substrate placement section at a rear of the apparatus, the wirings can be shortened and simplified. In addition, since a wiring work can be performed in one place, the work is facilitated.

In the image reading apparatus according to a seventh aspect of the present disclosure is the image reading apparatus according to any one of the fourth aspect to the sixth aspect further include a wiring connected to the first substrate or to the second substrate, wherein the wiring is disposed in a region of the first substrate and the second substrate in the first direction.

According to this aspect, the wiring connected to the first substrate or the second substrate is included in the region of the substrate in the first direction. Accordingly, since the wiring does not protrude upward or downward with respect to the substrate, the dimension in the height direction of the apparatus can be suppressed.

In the image reading apparatus according to an eighth aspect of the present disclosure is the image reading apparatus according to anyone of the first aspect to the seventh aspect further include a first holding section and a second holding section configured to hold the document feed unit so as to be pivotable with respect to the scanner unit, wherein the substrate placement section is provided between the first holding section and the second holding section.

Here, "between the first holding section and the second holding section" in "the substrate placement section is provided between the first holding section and the second holding section" does not need to be completely contained therebetween, for example, means that the substrate placement section may be disposed between respective outer end sections of the first holding section and the second holding section in the left-right direction.

According to this aspect, since the first substrate and the second substrate provided in the substrate placement section are provided between the first holding section and the second holding section, the size in the left-right direction can be suppressed.

In the image reading apparatus according to a ninth aspect of the present disclosure is the image reading apparatus according to any one of the first aspect to the seventh aspect further include
 a holding section configured to hold the document feed unit so as to be pivotable with respect to the scanner unit, wherein the document feed unit includes a feed section configured to feed the document and a drive section configured to drive the feed section and the substrate placement section is provided between the holding section and the drive section.

Here, "between the holding section and the drive section" in "the substrate placement section is provided between the holding section and the drive section" does not needs to be completely contained therebetween, for example, means that the substrate placement section may be disposed between respective outer end sections of the holding section and the driving section in the left-right direction and the front-rear direction.

According to this aspect, since the first substrate and the second substrate provided in the substrate placement section are provided between the holding section and the drive section, the size in the left-right direction and the front-rear direction can be suppressed.

In addition, in any one of the first aspect to the ninth aspect, the scanner unit may include a cable configured to transmit data obtained by reading the document to the first substrate, and the substrate placement section may be disposed so as to overlap the cable as viewed in the horizontal direction.

With this arrangement, since the cable, which is, for example, an FFC or the like used for receiving data obtained by reading the second surface, and the substrate placement section overlap with each other, the size of the apparatus becoming large due to the cable can be suppressed.

Further, when the cable and the wiring are concentrated at the rear of the apparatus, the length of the cable and the wiring can be shortened, and the structure becomes simple. In addition, since the wiring work can be performed in one place, the work is facilitated.

In the image reading apparatus according to a tenth aspect of the present disclosure is the image reading apparatus according to any one of the first aspect to the ninth aspect wherein at least one of the first substrate and the second substrate is removably attached in the substrate placement section by an attachment member and the attachment member is inserted and extracted along a first direction, which intersects a horizontal direction.

According to this aspect, since the attachment direction of at least one of the first substrate and the second substrate via the attachment members is same as the insertion and extraction direction of the attachment member, it become easy to perform a work for attachment and detachment and it becomes easy to secure the work space.

In a recording apparatus according to an eleventh aspect of the present disclosure includes the image reading apparatus according to any one of the first aspect to the tenth aspect further include a recording unit configured to execute recording process based on data read by the image reading apparatus.

According to this aspect, it is possible to suppress an increase in size in the recording apparatus configured to record a reading result of the image reading apparatus on a medium.

In the recording apparatus according to a twelfth aspect of the present disclosure is the recording apparatus according to the eleventh aspect wherein the recording unit includes a control substrate configured to control the entire apparatus and the control substrate is connected to the first substrate or the second substrate by a wiring.

According to this aspect, the recording unit includes the control substrate configured to control the entire apparatus, and the control substrate is connected to the first substrate or the second substrate by the wiring. Thus, information can be exchanged between the image reading apparatus and the recording unit.

In the recording apparatus according to a thirteenth aspect of the present disclosure is the recording apparatus according to the twelfth aspect wherein the wiring is guided by a guide section and the guide section is pivotable with respect to the document feed unit.

According to this aspect, the wiring is guided by the guide section, and the guide section is provided so as to be pivotable with respect to the document feed unit. Thus, the wiring can be guided with a simple configuration, and the appearance can be improved.

In the recording apparatus according to a fourteenth aspect of the present disclosure is the recording apparatus according to the eleventh aspect wherein the recording unit includes a control substrate configured to control the entire apparatus and the control substrate overlaps the substrate placement section as viewed in a first direction, which intersects a horizontal direction.

According to this aspect, the recording unit includes the control substrate configured to control the entire apparatus, and the control substrate overlaps with the substrate placement section as viewed in the first direction, which intersects the horizontal direction. Accordingly, since the control substrate overlaps with the substrate placement section, the size of the apparatus can be effectively suppressed.

Embodiment

Hereinafter, an image reading apparatus according to an embodiment of the present disclosure and a recording apparatus including the image reading apparatus will be specifically described with reference to FIGS. 1 to 12.

In the following description, three axes orthogonal to each other are referred to as an X-axis, a Y-axis, and a Z-axis, as shown in the drawings. The Z-axis direction corresponds to the vertical direction (a direction in which gravity acts). The X-axis direction and the Y-axis direction correspond to a horizontal direction.

Figure 5:
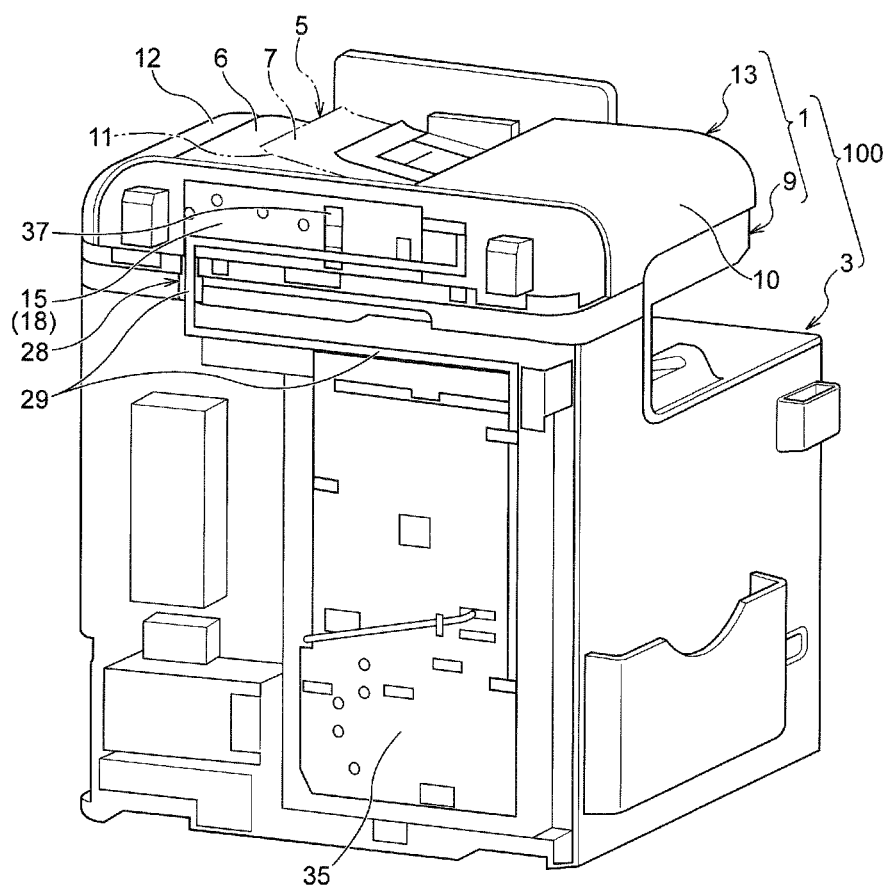
FIG. 5 is a rear perspective view of the recording apparatus according to the embodiment of the present disclosure.

As shown in FIG. 5, a recording apparatus 100 of the present embodiment includes an image reading apparatus 1 and a recording unit 3 capable of executing a recording process based on data read by the image reading apparatus 1.

In the present embodiment, the recording unit 3 is an ink jet printer that performs recording by using a transport roller to transport a medium (not shown), such as printing paper or the like, accommodated in a medium cassette or the like to a recording execution section that performs recording by a recording head or the like and ejecting ink there, and that is capable of executing recording based on data read by the image reading apparatus 1.

As shown in FIG. 5, the image reading apparatus 1 includes a scanner unit 9 configured to read a document 5, and an ADF unit 13 provided above the scanner unit 9 and configured to feed and read the document 5. The ADF unit 13 is an auto document feeder, and is an example of a document feed unit.

Figure 2:
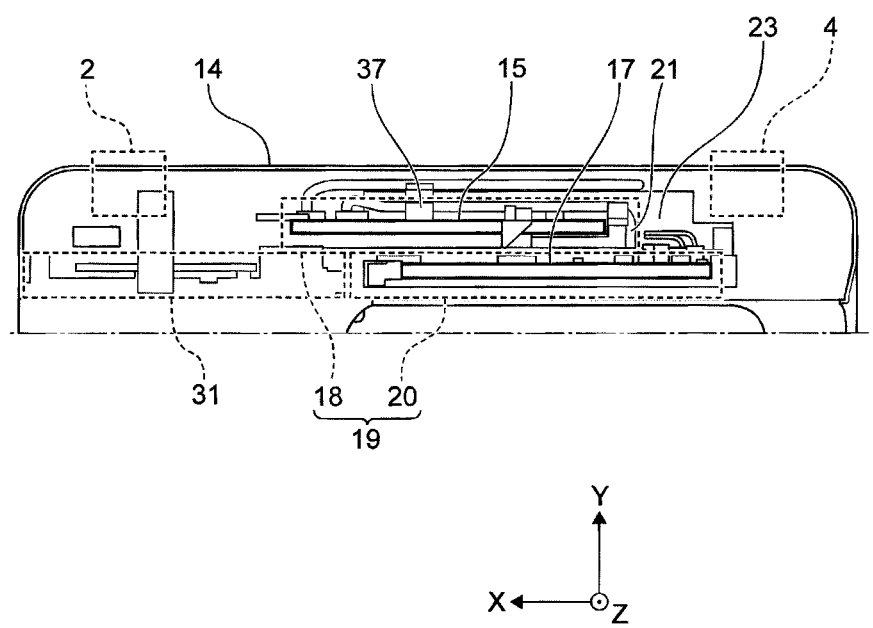
FIG. 2 is a plan view of a main section in a state in which a rear cover and an inner cover of the embodiment are removed.
Figure 4:
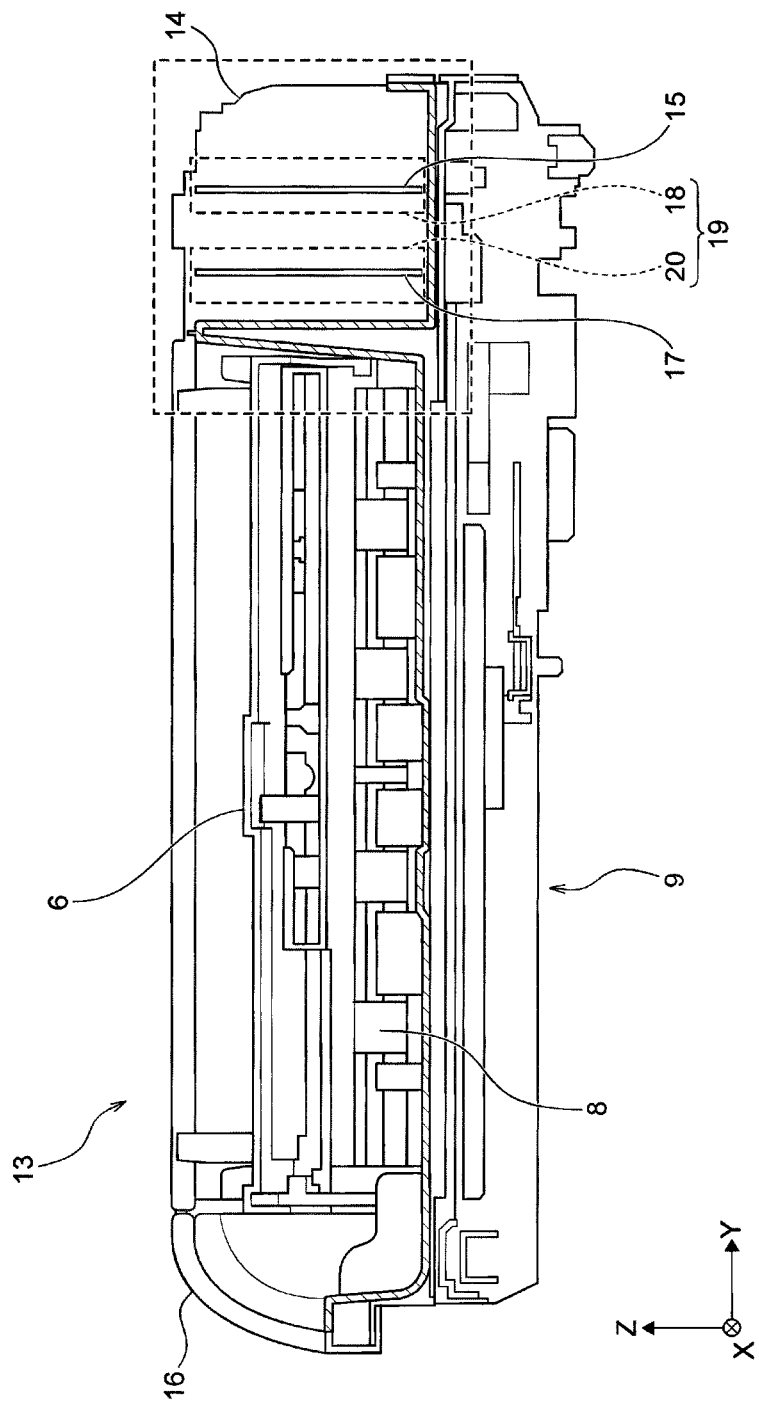
FIG. 4 is a right sectional view taken along the depth direction of FIG. 1.

Further, as shown in FIGS. 2 and 4, a first substrate 15 configured to control the operation of the scanner unit 9, and a second substrate 17 configured to control the operation of the ADF unit 13 are provided. Both the first substrate 15 and the second substrate 17 are provided in a substrate placement section 19 of the ADF unit 13. The substrate placement section 19 is located at a rear section 14 in a front-rear direction of the ADF unit 13.

As shown in FIGS. 1 and 2, the ADF unit 13 is pivotably attached to the scanner unit 9 located below by a pair of left and right hinges, that is, a first holding section 2 and a second holding section 4 located in the rear section 14. That is, the ADF unit 13 is attached to the scanner unit 9, and can be opened and closed with a front section 16 thereof as a free end.

Hereinafter, each component will be described in detail.

Scanner Unit

In the scanner unit 9 according to the present embodiment, by placing the ADF unit 13 into an "open" state with respect to the scanner unit 9, and placing a document 5 on a transparent document placing plate (not shown), reading is executed on the document 5 by a scanner reading section (not shown), such as a line image sensor disposed below the document placing plate. The scanner reading section moves along a reading surface of the document 5 in a width direction (X-axis direction) of the apparatus when executing reading.

It should be noted that illustration of a state in which the document 5 being read by the scanner reading section while the document 5 is placed on the document placing plate is omitted because it is within a scope of public knowledge.

ADF Unit

As shown in FIGS. 1 and 5, in a state in which the ADF unit 13 is "closed" with respect to the scanner unit 9, the document 5 set on the feed tray 6 is fed along a feed path by the feed section. The feed section includes a known pickup roller (not shown) and a feed roller 8 (FIG. 4). The feed path has a U-shaped inversion section 10, and the document 5 fed along the feed path is discharged onto a discharge tray 12. The discharge tray 12 is positioned above the document placing plate of the scanner unit 9.

While the document 5 is fed through the U-shaped inversion section 10, the document 5 is read by an ADF reading section (not shown) such as the line image sensor. The ADF reading section is disposed so as to read an image of a second surface 11, which is a surface of the document 5 set on the feed tray 6 and which is in contact with the feed tray 6.

It should be noted that an illustration of a state in which the document 5 fed by the feed section is being read by the ADF reading section is omitted because it is within the scope of public knowledge.

In the present embodiment, the ADF unit 13 is removably provided to a rear cover 22 at the rear section 14 thereof. When the rear cover 22 is removed, the substrate placement section 19 covered from above by an upper cover 24 (FIG. 3) made of a flame retardant material appears. The upper cover 24 is also removable, and by removing the upper cover 24, the substrate placement section 19 is exposed, so that the replacement work or the like of the first substrate 15 and the second substrate 17 can be performed.

Figure 3:
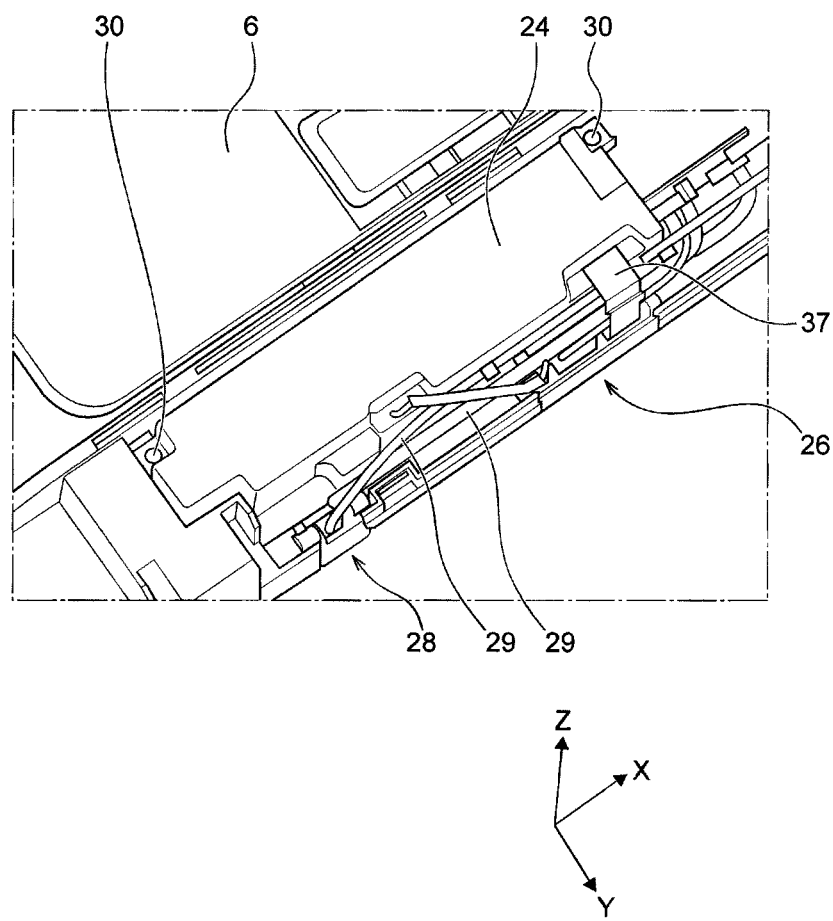
FIG. 3 is an enlarged perspective view of the main part in a state in which an inner cover of the embodiment is attached.

A state in which the rear cover 22 is removed from a state in FIG. 1 is a state in FIG. 3, and a state in which the upper cover 24 is removed from the state in FIG. 3 is a state in FIG. 2.

The upper cover 24 is removably attached to an attachment section of the ADF unit 13 by two screws 30. The rear cover 22 is also removably attached to the attachment section of the ADF unit 13 by a plurality of screws (not shown).

When Images are Formed on Both Front and Back Surfaces of the Document

The image reading apparatus 1 of the present embodiment is configured such that, when images are formed on both front and back surfaces of the document 5, images on both surfaces can be read at once. That is, while the document 5 set on the feed tray 6 is fed by a feed mechanism along the feed path having the U-shaped inversion section 10, the document 5 passes between the ADF reading section and the scanner reading section. During this passing, the scanner reading section does not move and is maintained in a stopped state. Thus, images on both sides of the document 5 can be read at once by using the ADF reading section and the scanner reading section.

Specifically, in FIG. 5, the second surface 11 of the document 5 set on the feed tray 6 is read by the ADF reading section, and a first surface 7, which is the opposite of the document 5 from the second surface 11, is read by the scanner reading section which is in the stopped state.

Substrate Placement Section, First Substrate, and Second Substrate

In this embodiment, as described above, the substrate placement section 19 is located in the rear section 14 of the ADF unit 13. The first substrate 15 is disposed so as to extend in a direction, which intersects the horizontal direction. The second substrate 17 is also disposed so as to extend in a direction, which intersects the horizontal direction. That is, both the first substrate 15 and the second substrate 17 are disposed in the substrate placement section 19 so as to extend in a first direction, which intersects the horizontal direction.

Specifically, as shown in FIGS. 2 and 4, the first substrate 15 and the second substrate 17 are disposed vertical in the substrate placement section 19. The first substrate 15 and the second substrate 17 are disposed in a positional relationship in which they overlap each other as viewed in the horizontal direction. Here, the substrate placement section 19 is a region including both a region a first region 18 occupied by disposing the first substrate 15 there and a second region 20 occupied by disposing the second substrate 17 there.

It should be noted that "vertical" does not necessitate vertical, that is, straight upright in a strict sense, and may be inclined within a range in which an effect of the present disclosure can be obtained. In addition, "parallel" does not necessitate being parallel in a strict sense, that is, may be shifted from parallel within a range in which an effect of the present disclosure can be obtained.

Furthermore, in this embodiment, as can be understood from FIGS. 2 and 4, the first substrate 15 is disposed to the outside of the second substrate 17. Here, by disposing the first substrate 15 directly above a wiring outlet 28 of the scanner unit 9, it is possible to suppress the likelihood that the wiring route of the scanner unit 9 will become complicated.

Wiring

Figure 6:
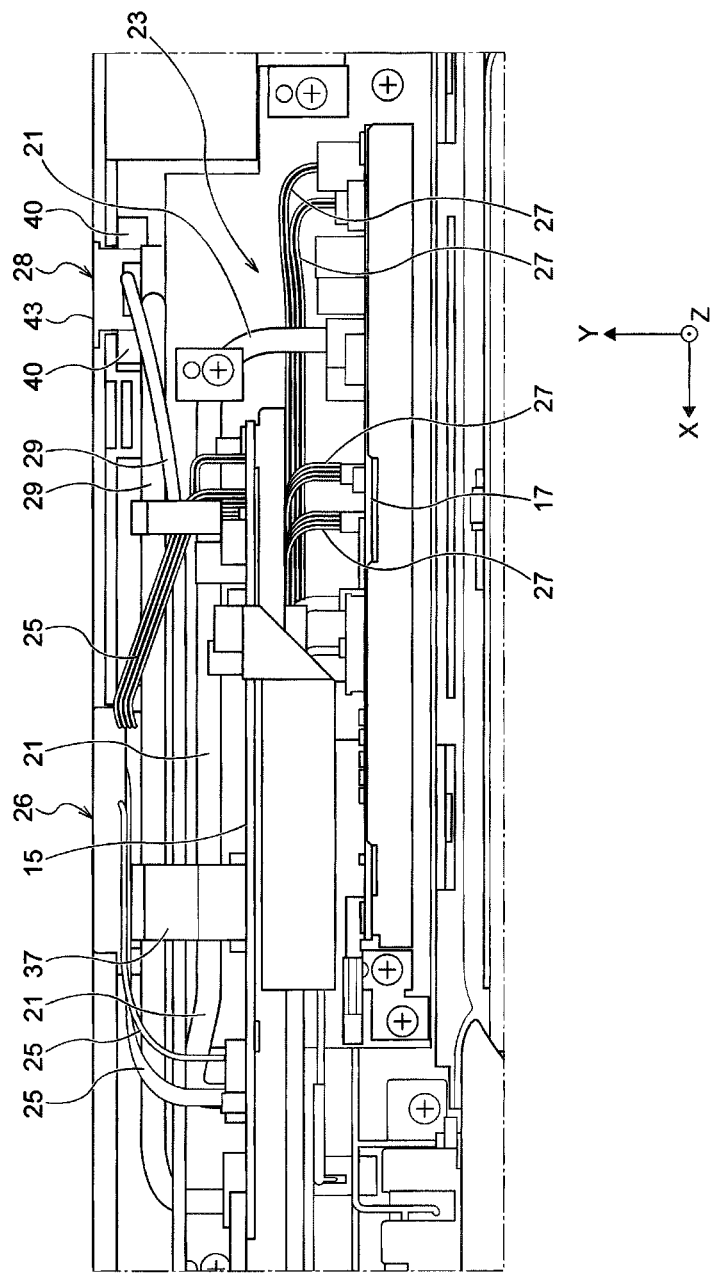
FIG. 6 is an enlarged plan view of the main section of FIG. 2.
Figure 7:
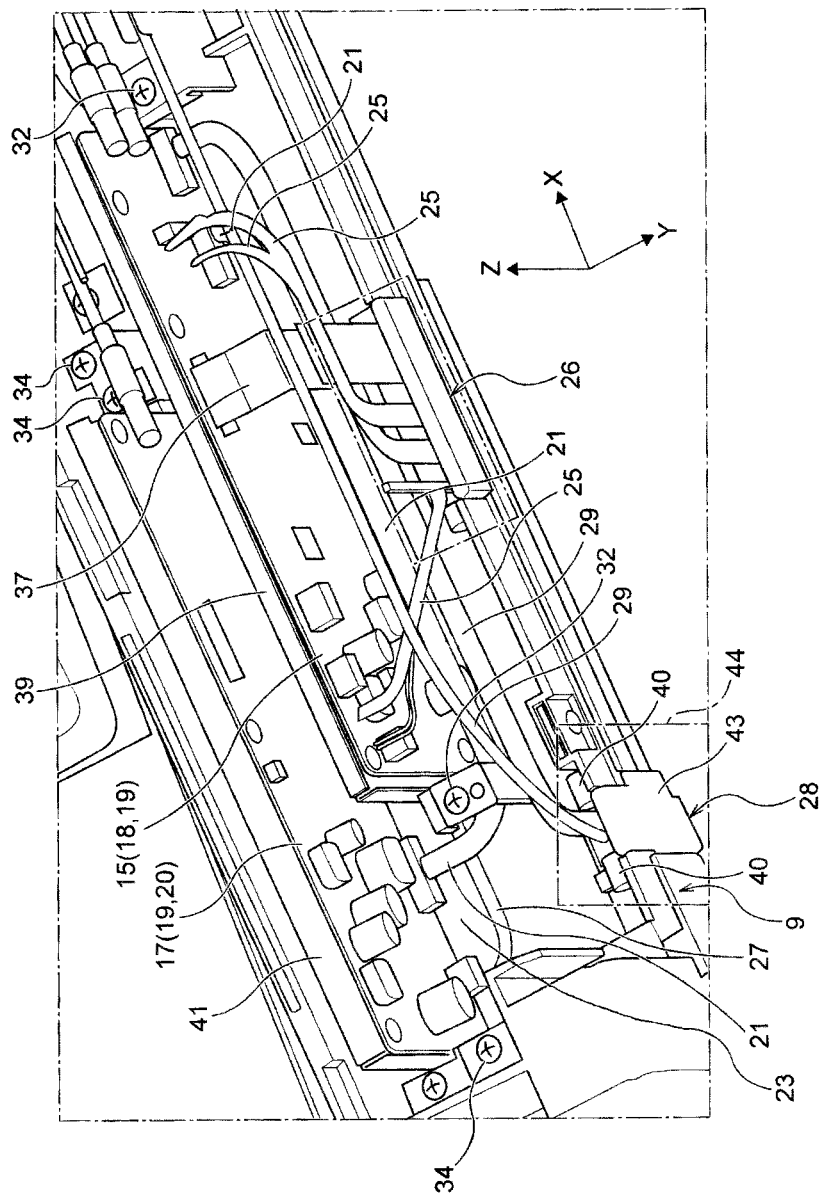
FIG. 7 is an enlarged perspective view of the main section of FIG. 2.

Further, as shown in FIGS. 6 and 7, in the present embodiment, a wiring 21 for connecting the first substrate 15 and the second substrate 17 is provided. Then, a non-overlapping region 23, in which the first substrate 15 and the second substrate 17 do not overlap each other as viewed in the horizontal direction, is provided so as to overlap the wiring 21 as viewed in the horizontal direction. Here, as can be understood from FIGS. 6 and 7, the "non-overlapping region 23 as viewed in the horizontal direction" is a region that occurs by the first substrate 15 and the second substrate 17 being shifted from each other in the width direction (X-axis direction) of the apparatus.

Signals can be exchanged between the first substrate 15 and the second substrate 17 by the wiring 21. For example, when images on both sides of the document 5 are read at once using the ADF reading section and the scanner reading section, data read by the scanner reading section is transmitted from the first substrate 15 to the second substrate 7 via the wiring 21. The scanner reading section and the second substrate 17 may be directly connected by wiring so that the read data is directly transmitted to the second substrate 17.

Here, "overlap the wiring 21 as viewed in the horizontal direction" means that the wiring 21 connecting the first substrate 15 and the second substrate 17 is disposed through the non-overlapping region 23.

The wiring 21 is a wiring that connects the first substrate 15 and the second substrate 17, but is not limited thereto.

In other words, in FIG. 6, the wiring 21 extends so as to intersect with a line extending from the first substrate 15, which is provided to the outside of the second substrate 17.

Therefore, when there is no "non-overlapping region as viewed in the horizontal direction" of the first substrate 15 and the second substrate 17, the wiring 21 bypasses around the outside of the substrate placement section 19, and there is a concern that the size of the device will increase because of wiring space.

On the other hand, in the present embodiment, since the wiring 21, which extends so as to intersect with a line extending from the first substrate 15, is provided so as to overlap the "non-overlapping region as viewed in the horizontal direction" of the first substrate 15 and the second substrate 17, it is possible to suppress an increase in size of the device due to wiring space.

Further, as shown in FIGS. 6 and 7, wirings 25, 27, and 29 connected to the first substrate 15 or the second substrate 17 are provided in addition to the wiring 21. The wirings 25, 27, and 29 are connected to various sensors or to actuators or the like such as motors or the like. The wiring 21 and the wirings 25, 27, and 29 are provided so as to be disposed within a region in the first direction, that is, the described above "vertical" direction, within which the first substrate 15 and the second substrate 17 are located. In other words, the wiring 21 and the wirings 25, 27, and 29 are disposed so as to be routed in the left-right direction (X-axis direction) and the depth direction (Y-axis direction), but are not disposed vertically above or below the first substrate 15 and the second substrate 7, that is, they do no project higher or lower in the vertical direction (Z-axis direction) than does the first substrate 15 or the second substrate 7.

In the first substrate 15 and the second substrate 17, portions where the wiring 21 and the wirings 25, 27, and 29 are connected have connectors that enable the wiring 21 and the wirings 25, 27, and 29 to be routed in the left-right direction (X-axis direction) and the depth direction (Y-axis direction). Further, by removing the wiring 21 and the wirings 25, 27, and 29 from the connectors, the first substrate 15 and the second substrate 17 are separated from the respective wirings to be in a free state, and can be easily removed from the ADF unit 13.

Further, the wiring 21 and the wirings 25, 27, and 29 are concentrated in a rear section of the ADF unit 13.

Although a part of the wirings 25, 27, and 29 are not shown in the drawing in order to avoid complication of the drawing, the wirings 25, 27, and 29 are also arranged so as not to project in the vertical direction (Z-axis direction) from the first substrate 15 and the second substrate 7.

Here, the wiring 25 indicates a wiring that extends from the first substrate 15 and is connected to a drive mechanism section (not shown) of the scanner unit 9. The wiring 25 passes through a wiring outlet 26 and is introduced from inside of the ADF unit 13 into inside of the scanner unit 9.

The wiring 27 indicates a wiring that extends from the second substrate 17 and is connected to a drive section 31 (FIG. 2) of the ADF unit 13. The second substrate 17 is positioned on the right side of the drive section 31.

The wiring 29 indicates a wiring that extends from the first substrate 15 and is connected to a main substrate 35 (FIG. 5) of the recording unit 3. The main substrate 35 is an example of a control substrate configured to control the entire apparatus. The wiring 29 passes through the wiring outlet 28 and is introduced from inside of the ADF unit 13 into the inside of recording unit 3.

As shown in FIG. 5, the wiring 29 introduced into the recording unit 3 is connected to the main substrate 35, which controls the entire apparatus included in the recording unit 3. By this, the recording unit 3 can execute recording based on the data read by the image reading apparatus 1.

In the present embodiment, the main substrate 35 is disposed so as to overlap with the substrate placement section 19 as viewed in the first direction, that is, as viewed in the vertical direction.

Specifically, the main substrate 35 is disposed at a rear section of the recording unit 3 in the front-rear direction. The main substrate 35 is disposed "vertical" at a position in substantially the same rear section as the first substrate 15 in a region below the wiring outlet 28. In other words, the plane formed by the main substrate 35 and the plane formed by the first substrate 15 are disposed in a state in which they can be regarded as substantially one plane. Here, "a state in which they can be regarded as substantially one plane" means that one of the planes may protrude as long as the planes overlap each other.

Cable of Scanner Unit

As shown in FIG. 7, in the present embodiment, the scanner unit 9 includes a cable 37 for transmitting data obtained by reading the document 5 by the scanner reading section (not shown) to the first substrate 15. The cable 37 is formed by an FFC. The substrate placement section 19 is disposed so as to overlap with the cable 37 as viewed in the horizontal direction. By this, since the cable 37 is disposed at a position within a width direction of the substrate placement section 19, the required length of the cable 37 can be shortened.

In addition, since the cable 37 can be connected by being drawn out directly upward without being routed left or right, the length can be more effectively suppressed.

The cable 37 is configured to be removed from a connection portion of the first substrate 15. By removing the cable 37 from the connection portion of the first substrate 15, the first substrate 15 is separated from the cable 37 to be in a free state, and can be easily removed from the ADF unit 13.

As shown in FIG. 7, in the present embodiment, the first substrate 15 and the second substrate 17 are removably attached to the substrate placement section 19 by an attachment member 39 and an attachment member 41, respectively. The attachment members 39 and 41 are configured to be inserted and extracted along the first direction, which intersects the horizontal direction, that is, in the vertical direction. Here, the attachment members 39 and 41 are configured by shield plates made from sheet metal, and have a shape and a structure capable of holding the first substrate 15 and the second substrate 17, which are the targets to be held.

More specifically, the attachment member 39 is attached to the attachment section of the ADF unit 13 by two screws 32, and the attachment member 41 is attached to the attachment section of the ADF unit 13 by three screws 34. By removing these screws 32 and 34, the attachment members 39 and 41 can be drawn upward.

Figure 8:
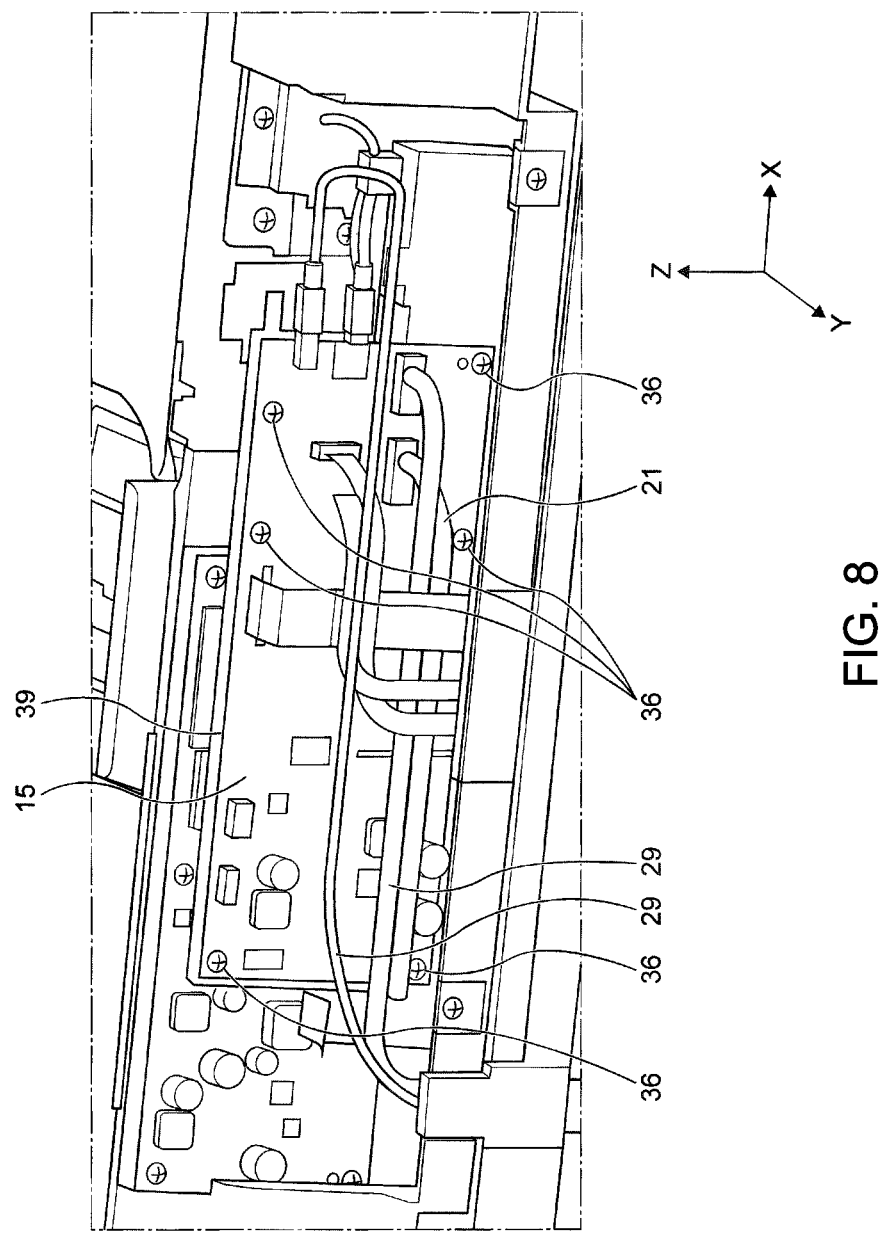
FIG. 8 is an enlarged perspective view of the main section viewed in a different direction from FIG. 7.

Further, as shown in FIG. 8, the first substrate 15 is removably attached to the attachment member 39 by six screws 36. By removing all of the screws 36, the first substrate 15 can be removed from the attachment member 39.

Figure 9:
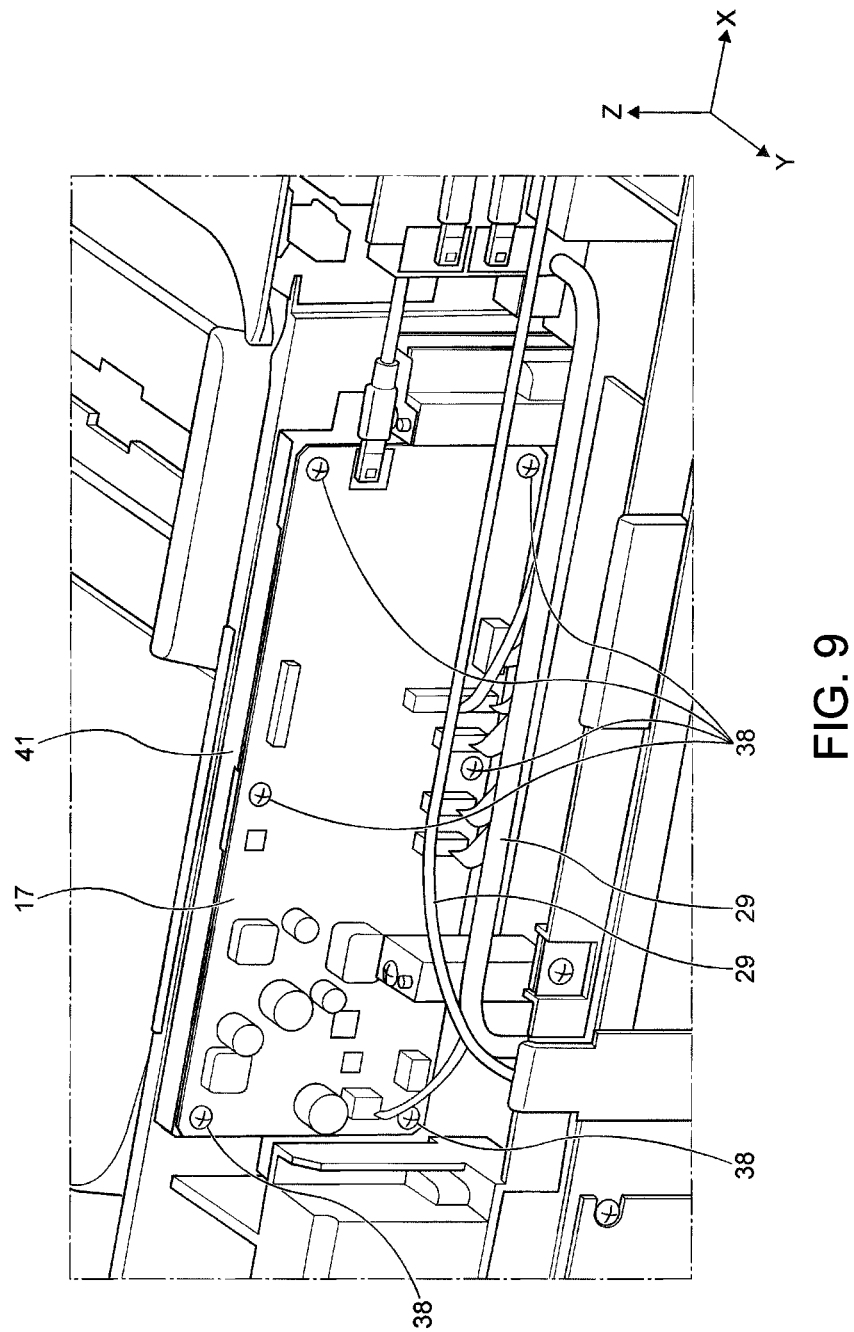
FIG. 9 is an enlarged perspective view of the main section in a state in which a first substrate is removed from FIG. 8.

As shown in FIG. 9, the second substrate 17 is removably attached to an attachment member 41 by six screws 38. By removing all of the screws 38, the second substrate 17 can be removed from the attachment member 41. FIG. 9 is a view in which the first substrate 15 is removed from FIG. 8 so that entire of the second substrate 17 can be seen.

As shown in FIG. 2, the first holding section 2 and the second holding section 4, which pivotably hold the ADF unit 13 with respect to the scanner unit 9, are provided on left and right sides of the rear section 14 of the apparatus as described above. The substrate placement section 19 is provided between the first holding section 2 and the second holding section 4 in the left-right direction (X-axis direction).

Further, the ADF unit 13 includes a feed section constituted by feed roller 8 or the like for feed of the document 5, and the drive section 31 for drive of the feed section. The substrate placement section 19 is provided between the holding sections 2 and 4 and the drive section 31 in the depth direction (Y-axis direction).

Figure 10:
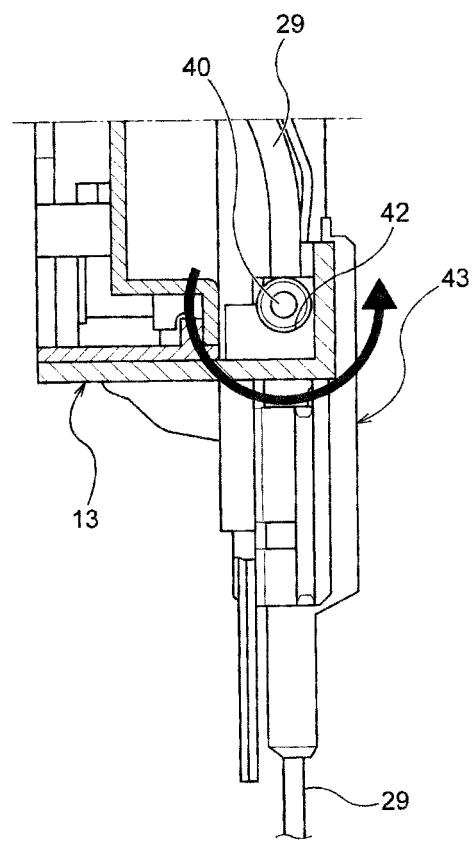
FIG. 10 is a side cross-sectional view showing a guide section of wiring at a wiring outlet to a recording unit side.

As shown in FIGS. 6, 7, and 10, the wiring 29 is guided by a guide section 43, and the guide section 43 is provided so as to be pivotably with respect to the ADF unit 13. The wiring 29 is guided from the inside to the outside of the ADF unit 13 through the inside of the guide section 43.

The guide section 43 is pivotably attached to an attachment section 42 of the ADF unit 13 by a shaft 40. In this state, the guide section 43 is inserted into an attachment section 44 (FIG. 7) of the scanner unit 9. As a result, the ADF unit 13 is able to pivot about the shaft 40 relative to the scanner unit 9.

Replacement Work of First Substrate and Second Substrate

First, the rear cover 22 (FIG. 1) located at the rear section 14 of the ADF unit 13 is removed, and then the upper cover 24 (FIG. 3) is also removed. As a result, the substrate placement section 19 is exposed, and replacement work or the like of the first substrate 15 and the second substrate 17 can be performed (FIGS. 2 and 7).

Subsequently, by removing the two screws 32, the attachment member 39, to which is attached the first substrate 15 located outside the rear section 14, can be pulled out upward. The first substrate 15 can be removed from the attachment member 39 by removing the six screws 36 (FIG. 8) in a state in which the attachment member 39 is pulled out. At this time, the first substrate 15 is brought into a free state by removing the wiring 21 and the wirings 25, 27, and 29 from the connection portions of the first substrate 15.

Then, the first substrate 15, which is the target of exchange, is removed and replaced with a new first substrate 15, and the procedure in the reverse order from that of the above is performed to complete the replacement work.

In the replacement work of the second substrate 17, by removing the three screws 34 in the state of FIG. 7, the attachment member 41, to which the second substrate 17 is attached, can be pulled out upward. The second substrate 17 can be removed from the attachment member 41 by removing the six screws 38 (FIG. 9) in a state in which the attachment member 41 is pulled out. At this time, the second substrate 17 is brought into a free state by removing the wiring 21 and the wirings 25, 27, and 29 from the connection portions of the second substrate 17.

Then, the second substrate 17, which is the target of exchange, is removed and replaced with a new second substrate 17, and the procedure is the reverse order from that of the above is performed to complete the replacement work.

Description of Effects of Embodiment (1) According to the present embodiment, the first substrate 15 and the second substrate 17 are provided in the substrate placement section 19 of the ADF unit 13. Thus, since both the first substrate 15 for the scanner unit 9 and the second substrate 17 for the ADF unit 13 are provided in the ADF unit 13, it is not necessary to secure a placement space for placing a control substrate in both of the scanner unit 9 and the ADF unit 13, and it is possible to suppress an increase in the size of the apparatus.

Further, when it becomes necessary to replace either or both of the first substrate 15 and the second substrate 17, the replacement work may be performed only on the ADF unit 13, and thus the work is facilitated.

(2) In addition, according to the present embodiment, by disposing the first substrate 15 in a direction, which intersects the horizontal direction, for example, vertically, the size in the horizontal direction, that is, the size in the front-rear direction or the left-right direction can be suppressed.

(3) In addition, according to the present embodiment, by disposing the second substrate 17 in a direction, which intersects the horizontal direction, for example, vertically, the size in the horizontal direction, that is, the size in the front-rear direction or the left-right direction can be suppressed.

(4) Further, according to the present embodiment, by arranging both the first substrate 15 and the second substrate 17 in a direction, which intersects the horizontal direction, for example, vertically, it is possible to more effectively suppress an increase in the size of the apparatus in the horizontal direction, for example, the front-rear direction.

Furthermore, since the first substrate 15 and the second substrate 17 overlap each other as viewed in the horizontal direction, it is possible to suppress the size of the apparatus in the horizontal direction, for example, the left-right direction.

(5) In addition, according to this embodiment, since the first substrate 15 is disposed to be outside with respect to the second substrate 17, when only the first substrate 15 is to be removed for maintenance or the like, it is not necessary to remove the second substrate 17 or the wirings 25, 27, and 29 connected to the second substrate. Therefore, the work is easier.

Further, by disposing the first substrate 15 directly above the wiring outlets 26 and 28 of the scanner unit 9, it is possible to suppress the wiring route of the scanner unit 9 from becoming complicated.

(6) In addition, according to the present embodiment, by using the non-overlapping region 23, where the first substrate 15 and the second substrate 17 do not overlap each other as viewed in the horizontal direction, as a placement space for the wiring 21 that connects the first substrate 15 and the second substrate 17, it is possible to suppress an increase in the size of the apparatus due to the protrusion of the wiring 21.

If the wirings 21, 25, 27, and 29 are concentrated in the rear section 14, which is the rear section of the apparatus, these wirings can be shortened and simplified. In addition, since a wiring work can be performed in one place, the work is facilitated.

(7) According to the present embodiment, the wirings 21, 25, 27, and 29 connected to the first substrate 15 or to the second substrate 17 are disposed in a region of the first substrates 15 and second substrates 17 in the first direction (Z-axis direction). As a result, since the wirings 21, 25, 27, and 29 do not protrude upward or downward with respect to the first substrates 15 and second substrates 17, the dimension in the height direction of the apparatus can be suppressed.

(8) According to the present embodiment, since the first substrate 15 and the second substrate 17 provided in the substrate placement section 19 are provided between the first holding section 2 and the second holding section 4, the size in the left-right direction can be suppressed.

(9) According to the present embodiment, since the first substrate 15 and the second substrate 17 provided in the substrate placement section 19 are provided between the holding sections 2 and 4 and the drive section 31, the size in the left-right direction and the front-rear direction can be suppressed.

(10) According to the present embodiment, since the cable 37, which is, for example, an FFC or the like used for receiving data obtained by reading the second surface 11, and the substrate placement section 19 overlap with each other, the size of the apparatus becoming large due to the cable 37 can be suppressed.

Further, when the cable 37 and the wirings 21, 25, 27, and 29 are concentrated in the rear section 14 of the apparatus, the lengths of the cable 37 and the wirings 21, 25, 27, and 29 can be shortened, and the structure becomes simple. In addition, since the wiring work can be performed in one place, the work is facilitated.

(11) According to the embodiment, the first substrate 15 and the second substrate 17 are removably attached in the substrate placement section 19 by the attachment members 39 and 41, and the attachment members 39 and 41 are inserted and extracted along the first direction, which intersects the horizontal direction. As a result, since the attachment direction of the first substrate 15 and the second substrate 17 via the attachment members 39 and 41 is same as the insertion and extraction direction of the attachment members 39 and 41, it become easy to perform the work for attachment and it becomes easy to secure the work space.

(12) The recording apparatus 100 according to the present embodiment includes the image reading apparatus 1 and the recording unit 3 configured to execute recording process based on data read by the image reading apparatus 1. By this, it is possible to suppress an increase in size in the recording apparatus 100 configured to record a reading result of the image reading apparatus 1 on a medium.

(13) According to the embodiment, the recording unit 3 includes the main substrate 35 configured to control the entire apparatus, and the main substrate 35 is connected to the first substrate 15 or the second substrate 17 by the wiring 29. Thus, information can be exchanged between the image reading apparatus 1 and the recording unit 3.

(14) According to the present embodiment, the wiring 29 is guided by the guide section 43, and the guide section 43 is provided so as to be pivotable with respect to the ADF unit 13. Thus, the wiring 29 can be guided with a simple configuration, and the appearance can also be improved.

(15) In addition, according to the embodiment, the recording unit 3 includes the main substrate 35 configured to control the entire apparatus, and the main substrate 35 overlaps with the substrate placement section 19 as viewed in the first direction (the Z-axis direction), which intersects the horizontal direction. Since the main substrate 35 overlaps the substrate placement section 19 in this manner, the size of the apparatus can be effectively suppressed.

Figure 11:
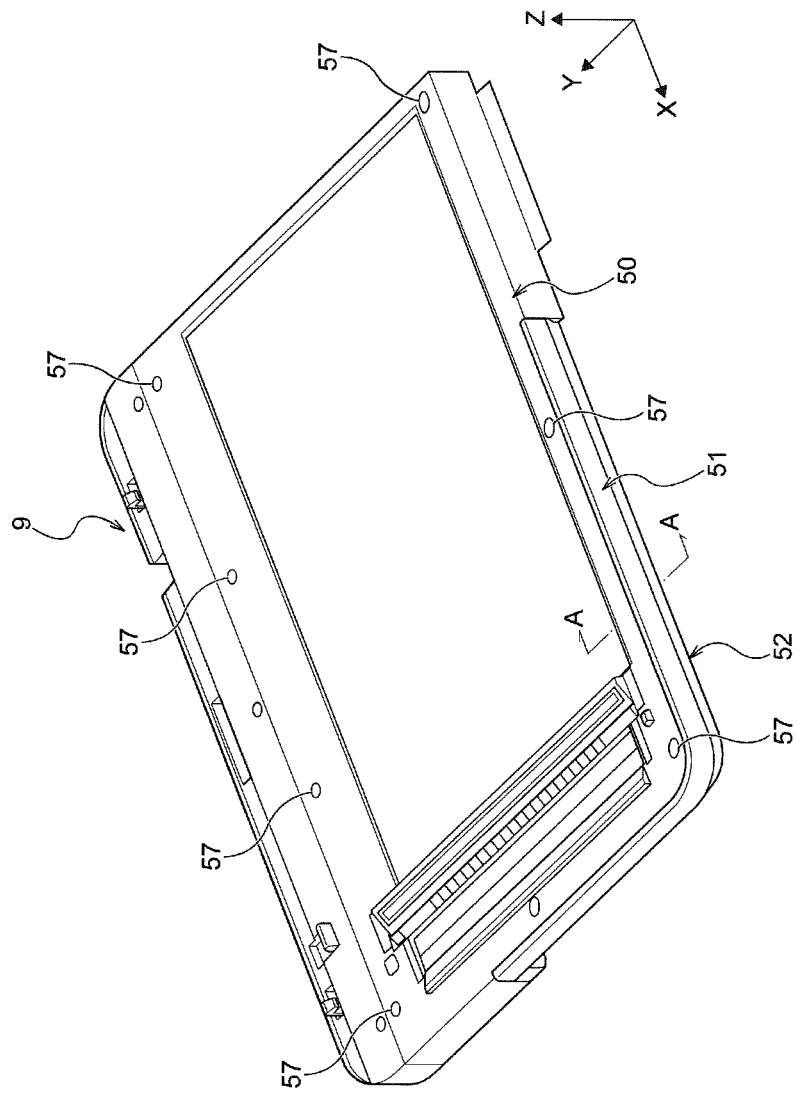
FIG. 11 is a perspective view of a scanner unit having a cosmetic line.
Figure 12:
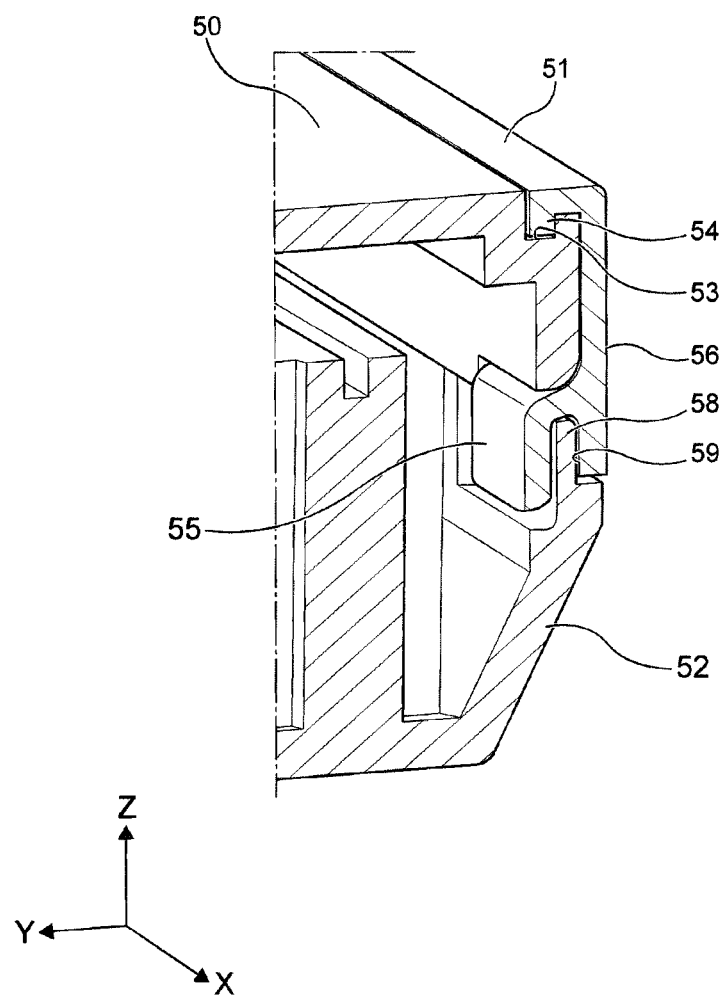
FIG. 12 is a sectional perspective view taken along line A-A in FIG. 11.

Attachment Structure of Cosmetic Line of Scanner Unit (FIGS. 11 and 12)

As shown in FIG. 11, sometimes a cosmetic line 51 is provided in a part of an upper case 50 forming a part of a case of the scanner unit 9. A lower case 52 is attached to a lower section of the uppercase 50 by a plurality of screws 57. Since the cosmetic line 51 is provided from the viewpoint of design or the like, a color different from that of the upper case 50 and the lower case 52 is used. For example, the upper case 50 is white, the cosmetic line 51 is blue, and the lower case 52 is black, or the like.

As shown in FIG. 12, a groove 53 is formed along an edge of an upper surface of the upper case 50. The inside of the groove 53 is isolated from the inside of the scanner unit 9, so that liquid such as water or the like and small foreign matter entering the groove 53 do not enter the inside of the scanner unit 9.

On the other hand, the cosmetic line 51 is provided with a downward-projecting convex section 54 at the upper section of a main body 56. The cosmetic line 51 is assembled to the upper case 50 by fitting the convex section 54 into the groove 53. As shown in FIG. 12, an L-shaped piece 55 protrudes from the inner surface of the lower section of the main body 56 of the cosmetic line 51. A plurality of the L-shaped pieces 55 are provided at intervals in the longitudinal direction of the cosmetic line 51.

The lower case 52 is provided with an insertion section 58 to be inserted into a U-shaped recess section 59 between the L-shaped piece 55 of the cosmetic line 51 and the main body 56.

By inserting the insertion section 58 of the lower case 52 into the U-shaped recess section 59 of the cosmetic line 51 in a state in which the convex section 54 of the cosmetic line 51 is fitted into the groove 53 of the upper case 50, the assembly of the upper case 50, the cosmetic line 51, and the lower case 52 is completed. In this state, the upper case 50 and the lower case 52 are fixed to each other by the screws 57. Although the cosmetic line 51 is not directly fixed by the screw 57, the cosmetic line 51 is attached as described above so as not to be unintentionally removed.

Figure 13:
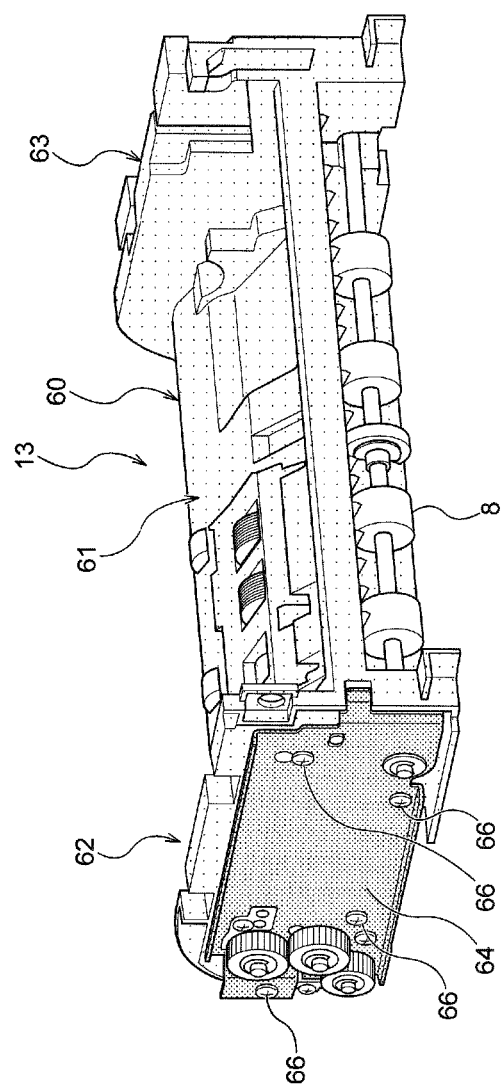
FIG. 13 is a perspective view of a main frame forming a feed path of an ADF unit.
Figure 14:
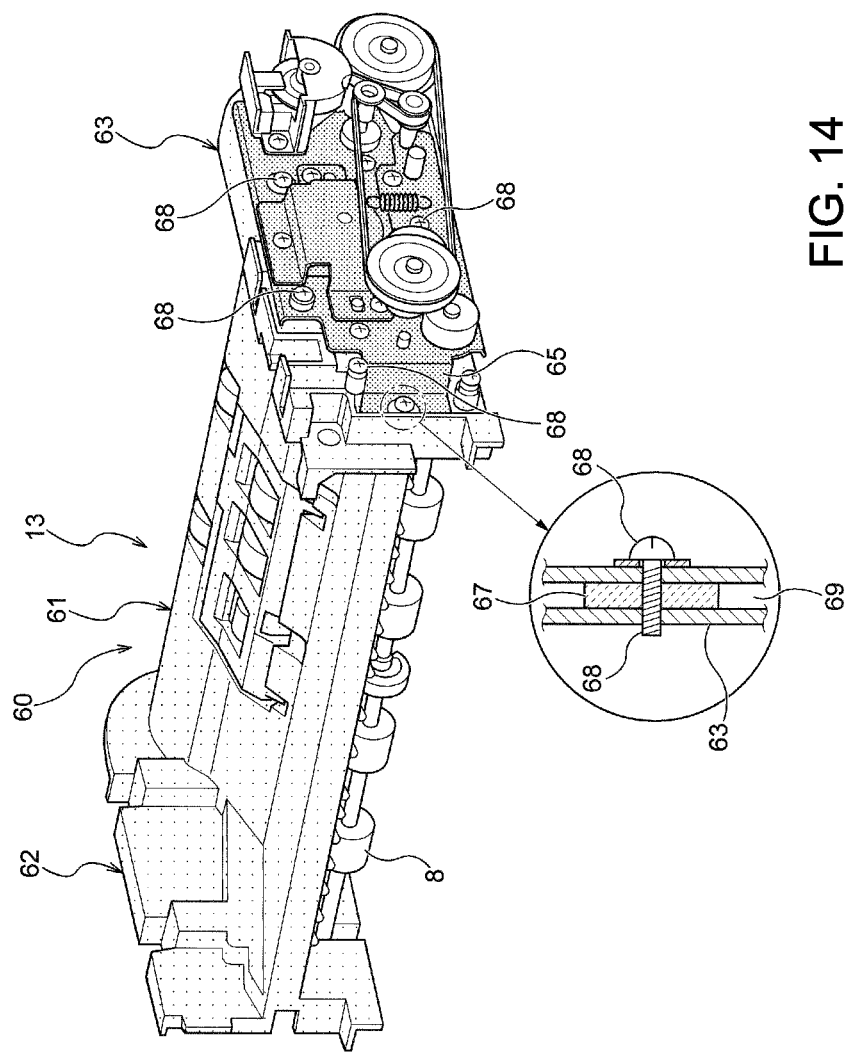
FIG. 14 is a perspective view of the main frame forming the feed path of the ADF unit.

Frame Structure Forming Feed Path of ADF Unit (FIGS. 13 and 14)

As shown in FIG. 13, a main frame 60 forming a feed path for feed of the document 5 in the ADF unit 13 is formed of a resin material. The main frame 60 includes a feed support surface section 61 configured to support the document 5, and a side surface section 62 and a side surface section 63 that are located on both sides, and has a substantially H-shape as a whole. The main frame 60, which is made entirely from a resin material, has a lower deformation resistance against external forces than would a main frame made by a sheet metal, and is easily twisted, for example. Therefore, here, a reinforcement frame 64 and a reinforcement frame 65 made from sheet metal are integrally joined to the side surface sections 62 and 63 to enhance deformation resistance.

Specifically, the reinforcement frame 64 is fixed to the side surface section 62 by a plurality of screws 66 in a surface contact state.

On the other hand, the reinforcement frame 65 is fixed to the side surface section 63 by screws 68 via a cushioning material 67 such as a rubber material or the like. As shown in the partially enlarged sectional view of FIG. 14, the reinforcement frame 65 has a gap 69 between the reinforcement frame 65 and the side surface section 63. Since a driving section such as a motor or the like is attached to the side surface section 63, vibration is generated. The cushioning material 67 and the gap 69 suppress vibration from being transmitted to the main frame 60. On the other hand, since the drive section such as the motor or the like is not attached to the side surface section 62, the above-described cushioning material is not provided.

Figure 15:
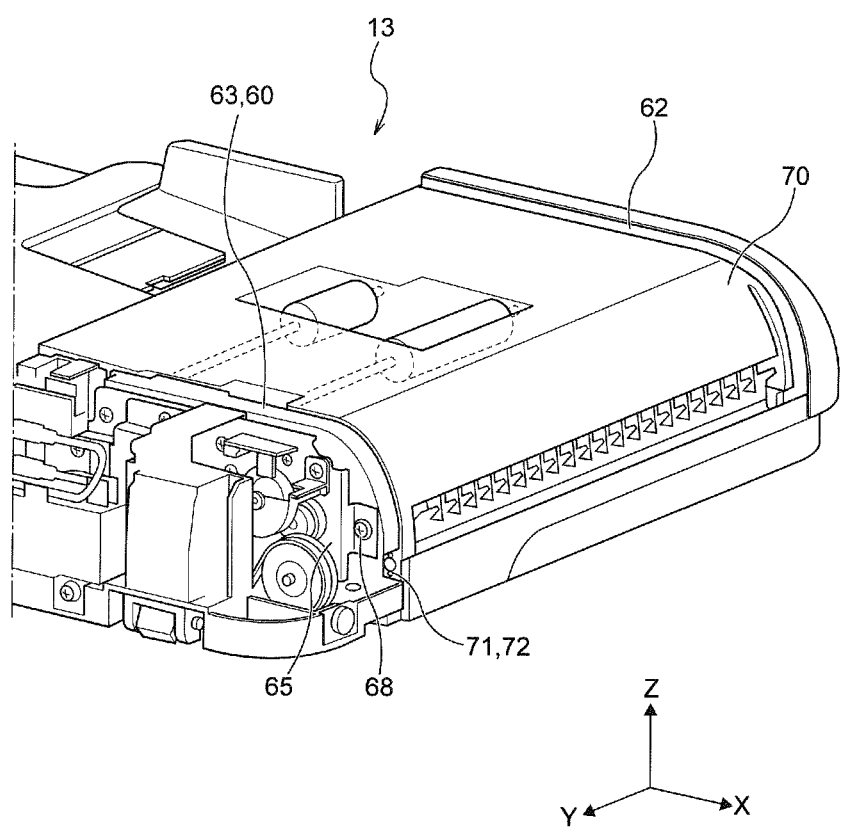
FIG. 15 is a perspective view of an ADF cover in a closed state.
Figure 16:
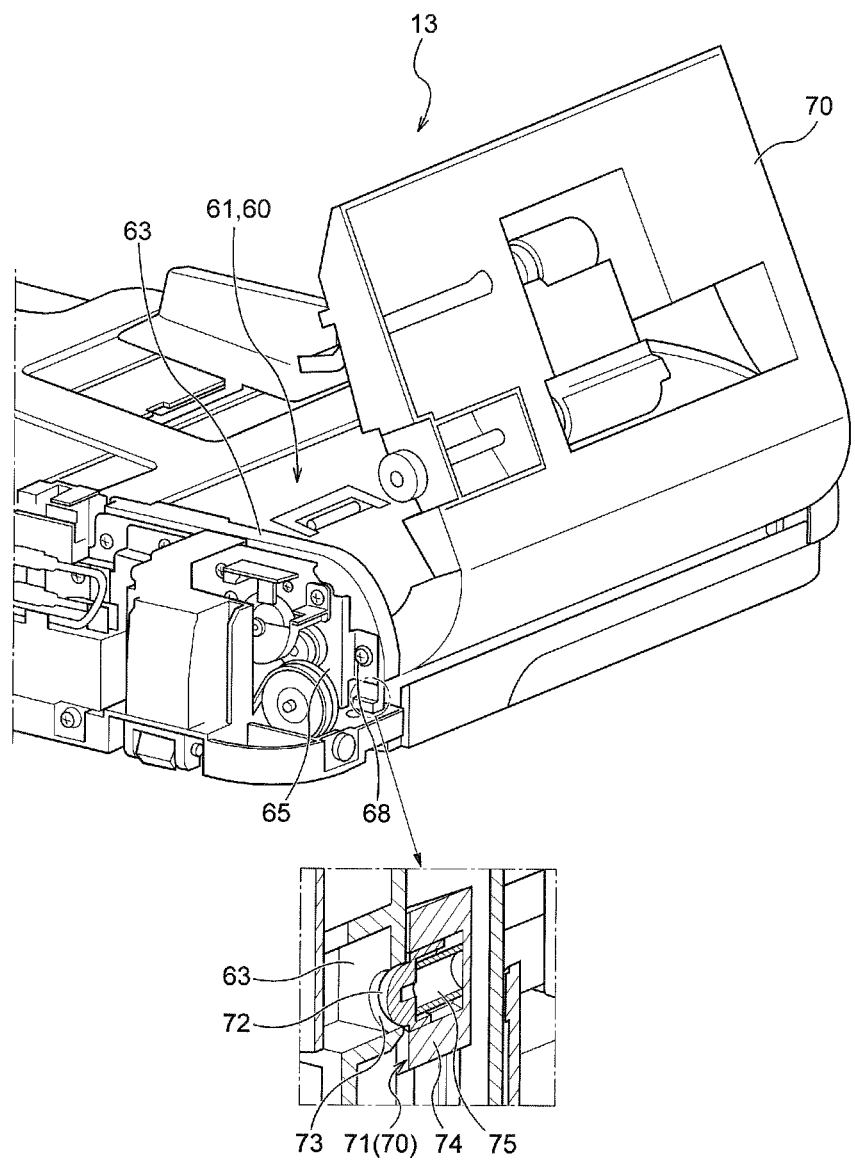
FIG. 16 is a perspective view of the ADF cover in an open state.
Figure 17:
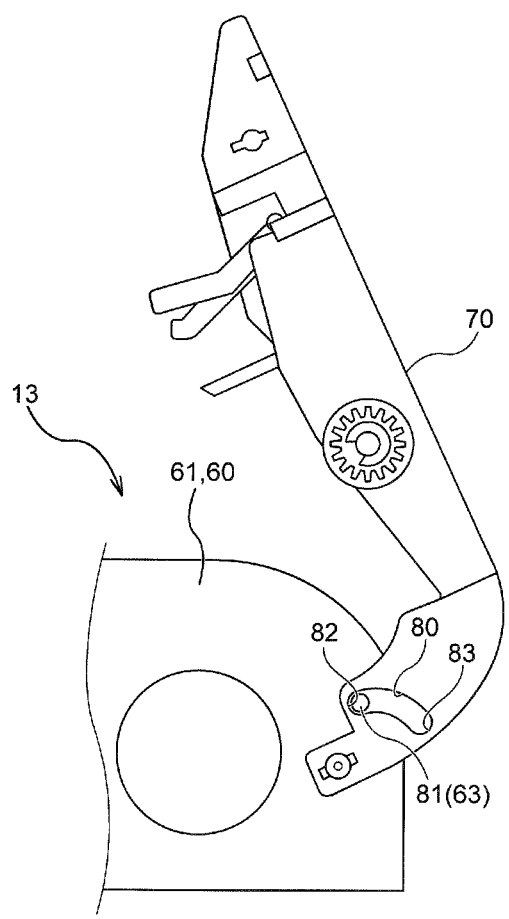
FIG. 17 is a side sectional view of the ADF cover in an open state.

Structure for Holding Open State of ADF Cover (FIGS. 15 to 17)

In the ADF unit 13, a paper stoppage, that is, a jam may occur when the document 5 is fed. In order to resolve the jam, the ADF cover 70 is configured to be opened and closed by pivoting in the vertical direction. FIG. 15 shows a state in which the ADF cover 70 is closed, and FIG. 16 shows a state in which the ADF cover 70 is opened.

As shown in FIG. 15, the ADF cover 70 includes a lock stacker 71 on a side surface below a pivotal fulcrum (not shown). One lock stacker 71 is provided on one side of the ADF cover 70. Note that one each may be provided on both sides. In this case, it is desirable that both on both sides have the same structure. The lock stacker 71 is configured such that a spring force is applied in a direction in which a semi-spherical section 72 protrudes outward, and stops at a position of a predetermined amount of protrusion.

In a state in which the ADF cover 70 is closed, as shown in FIG. 15, the semi-spherical section 72 of the lock stacker 71 is located at an external position not facing the side surface section 63 of the main frame 60. On the other hand, as shown in FIG. 16, when the ADF cover 70 pivots about the pivotal fulcrum and shifts to the opened state, the portion of the lock stacker 71 moves to an internal position facing the side surface section 63 of the main frame 60 and cannot be seen from the outside.

As shown in the partially enlarged sectional perspective view in FIG. 16, when the ADF cover 70 reaches the endpoint position of the opened state, the semi-spherical section 72 of the lock stacker 71 enters a hole 73 provided at a position corresponding to the side surface section 63 by the spring force and enters the locked state. As a result, the ADF cover 70 is held in the opened state. When the ADF cover 70 is pivoted in the closing direction, the semi-spherical section 72 is pushed back against the spring force, slides on the opposing surface of the side surface section 63, and reaches the end point position of the closed state (FIG. 15). In the drawings, reference numeral 74 denotes the lock stacker 71, and reference numeral 75 denotes a spring that applies the spring force.

FIG. 17 is another example of the structure for holding open state of ADF cover. In this example, an elongate groove 80 having a curved shape is formed on a side surface of the ADF cover 70, and a boss 81 protrudes from a corresponding side surface section 63. The boss 81 is configured to slide in the elongate groove 80 in the longitudinal direction. The elongate groove 80 and the boss 81 are provided on both sides of the ADF cover 70, but since those on both sides have the same structure, only those on one side will be described here.

One end section 82 of the elongate groove 80 locks with the boss 81 to hold the ADF cover 70 in the opened state. The other end section 83 of the elongate groove 80 locks with the boss 81 to hold the ADF cover 70 is closed state.

ANOTHER EMBODIMENT

The image reading apparatus 1 and the recording apparatus 100 according to the present disclosure basically have the configurations of the above-described embodiments, but it is needless to say that partial configuration changes, omissions, and the like can be made without departing from the scope of the present disclosure.

In the above embodiment, both of the first substrate 15 and the second substrate 17 are arranged vertical, but only one of the substrates may be disposed vertical.

Further, "vertical" is desirably straight upright, but it is not limited to straight upright, and may be inclined.

Although the case where the first substrate 15 is arranged to the outside with respect to the second substrate 17 was described in the above embodiment, the second substrate 17 may be arranged to the outside with respect to the first substrate 15. In this case, the main substrate 35 is connected to the second substrate 17.

What is claimed is:

1. An image reading apparatus comprising:
   a scanner unit configured to read a document placed on a document placement section;
   a document feed unit provided above the scanner unit and configured to feed the document and read the fed document;
   a first control substrate configured to control an operation of the scanner unit, the first control substrate being connected to the scanner unit via at least one first wiring; and
   a second control substrate configured to control an operation of the document feed unit, the second control substrate being connected to the document feed unit via at least one second wiring;
   a wiring connecting the first control substrate and the second control substrate, a non-overlapping region where the first control substrate and the second control substrate do not overlap each other as viewed in a horizontal direction overlaps the wiring as viewed in the horizontal direction, wherein
   the first control substrate and the second control substrate are provided in a substrate placement section inside of the document feed unit with the first control substrate and the second control substrate disposed to extend in a first direction, which intersects with a depth direction, with the first control substrate and the second control substrate overlapping when viewed in the depth direction.

2. The image reading apparatus according to claim 1, wherein
   the first control substrate is disposed so as to extend in the first direction, which intersects a horizontal direction.

3. The image reading apparatus according to claim 1, wherein
   the second control substrate is disposed so as to extend in the first direction, which intersects a horizontal direction.

4. The image reading apparatus according to claim 1, wherein
   the first control substrate is disposed in the document feed unit and to an outside of the document feed unit than the second control substrate.

5. The image reading apparatus according to claim 1, further comprising:
   a wiring connected to the first control substrate or to the second control substrate, wherein
   the first control substrate and the second control substrate are located within a region in the first direction, and
   the wiring is disposed within the region in the first direction.

6. The image reading apparatus according to claim 1, further comprising:
   a first holding section and a second holding section configured to hold the document feed unit so as to be pivotable with respect to the scanner unit, wherein
   the substrate placement section is provided between the first holding section and the second holding section.

7. The image reading apparatus according to claim 1, further comprising:
   a holding section configured to hold the document feed unit so as to be pivotable with respect to the scanner unit, wherein
   the document feed unit includes a feed section configured to feed the document and a drive section configured to drive the feed section and the substrate placement section is provided between the holding section and the drive section.

8. The image reading apparatus according to claim 1, wherein
at least one of the first control substrate and the second control substrate is removably attached in the substrate placement section by an attachment member and
the attachment member is inserted and extracted along a first direction, which intersects a horizontal direction.

9. A recording apparatus comprising:
the image reading apparatus according to claim 1 and
a recording unit configured to execute recording process based on data read by the image reading apparatus.

10. The recording apparatus according to claim 9, wherein
the recording unit includes a control substrate configured to control the entire recording apparatus and
the control substrate is connected to the first control substrate or the second control substrate by a wiring.

11. The recording apparatus according to claim 10, wherein
the wiring is guided by a guide section and
the guide section is pivotable with respect to the document feed unit.

12. The recording apparatus according to claim 9, wherein
the recording unit includes a control substrate configured to control the entire apparatus and
the control substrate overlaps the substrate placement section as viewed in a first direction, which intersects a horizontal direction.

13. The image reading apparatus according to claim 1,
a first surface of the first control substrate to which the wiring is not connected and a second control surface of the second control substrate to which the wiring is connected face each other.

14. The image reading apparatus according to claim 1, wherein
the document feed unit comprises a feeding tray, a rear cover farther to a rear of the document feed unit than the feeding tray, and an upper cover covered from above by the rear cover, the upper cover overlapping a substrate placement section from above.

* * * * *